US005131672A

United States Patent [19]

Robertson et al.

[11] Patent Number: 5,131,672

[45] Date of Patent: Jul. 21, 1992

[54] CAMBER ADJUSTMENT FITTING FOR A WHEELCHAIR

[75] Inventors: A. Scott Robertson, Pasadena; Richard Geiger, Fremont, both of Calif.

[73] Assignee: Medical Composite Technology, Soquel, Calif.

[21] Appl. No.: 516,057

[22] Filed: Apr. 27, 1990

[51] Int. Cl.[5] .......... B62M 1/14; B62D 17/00

[52] U.S. Cl. .......... 280/250.1; 280/304.1; 280/661; 297/DIG. 4

[58] Field of Search .......... 280/250.1, 647, 650, 280/657, 661, 304.1; 403/1, 4, 3, DIG. 8

[56] References Cited

U.S. PATENT DOCUMENTS

| | | | |
|---|---|---|---|
| Re. 32,242 | 9/1986 | Minnebraker | 280/250.1 |
| D. 254,970 | 5/1980 | Honzyou | D12/131 |
| D. 278,217 | 4/1985 | Nassiri | D12/131 |
| D. 294,476 | 3/1988 | Michel et al. | D12/133 |
| D. 300,733 | 4/1989 | Wagner | D12/131 |
| D. 304,815 | 11/1989 | Jones | D12/133 |
| D. 305,318 | 1/1990 | Danecker | D12/131 |
| 774,042 | 11/1904 | Cooper . | |
| 1,620,657 | 3/1927 | Herold . | |
| 1,851,843 | 3/1932 | Inman . | |
| 2,010,306 | 8/1935 | Leech | 155/94 |
| 2,022,348 | 11/1935 | Hoerle | 301/5.7 |
| 2,797,738 | 7/1957 | Patterson | 155/88 |
| 2,859,837 | 11/1958 | Mize | 188/2 |
| 3,189,385 | 6/1965 | Mommsen | 297/429 |
| 3,243,194 | 3/1966 | Trusock | 280/43.12 |
| 3,337,261 | 8/1967 | Nihlean et al. | 297/44 |
| 3,416,837 | 12/1968 | Saunders | 297/195 |
| 3,486,727 | 12/1969 | Timms | 248/397 |
| 3,882,949 | 5/1975 | Anderson | 180/8.2 |
| 3,937,490 | 2/1976 | Nasr | 280/250.1 |
| 4,082,348 | 4/1978 | Haury | 297/45 |
| 4,101,143 | 7/1978 | Sieber | 280/42 |
| 4,166,631 | 9/1979 | Sanaski | 280/250.1 |
| 4,169,626 | 10/1979 | Hollar, Jr. | 297/365 |
| 4,243,339 | 1/1981 | Dickerson | 403/4 |
| 4,350,227 | 9/1982 | Knoche | 188/2 F |
| 4,351,540 | 9/1982 | Minnebraker | 280/250.1 |
| 4,360,213 | 11/1982 | Rudwick et al. | 280/250.1 |
| 4,371,183 | 1/1983 | Dion | 280/42 |
| 4,380,343 | 4/1983 | Lovell et al. | 280/250.1 |
| 4,392,690 | 7/1983 | Anderson | 301/121 |
| 4,405,142 | 9/1983 | Whetstine | 280/250.1 |
| 4,422,660 | 12/1983 | Costello et al. | 280/250.1 |
| 4,428,594 | 1/1984 | Minnebraker | 280/250.1 |
| 4,477,098 | 10/1984 | Minnebraker | 280/250.1 |
| 4,477,117 | 10/1984 | Higgs | 297/45 |
| 4,483,653 | 11/1984 | Waite | 414/541 |
| 4,486,048 | 12/1984 | Meyer | 297/433 |
| 4,489,955 | 12/1984 | Hamilton | 280/250.1 |
| 4,494,889 | 1/1985 | Thompson | 403/4 |
| 4,500,102 | 2/1985 | Haury et al. | 280/250.1 |
| 4,500,112 | 2/1985 | Raidel | 280/693 |
| 4,506,901 | 3/1985 | Tosti | 280/250.1 |
| 4,570,756 | 2/1986 | Minnebraker et al. | 188/2 F |
| 4,572,576 | 2/1986 | Minnebraker | 297/429 |

(List continued on next page.)

*Primary Examiner*—Mitchell J. Hill
*Attorney, Agent, or Firm*—Burns, Doane, Swecker & Mathis

[57] ABSTRACT

A number of pairs of plug-in chamber angle adjustment plugs are provided having preset angled bores for selection of a desired camber angle for the wheels of the wheelchair. The preset angles are embodies in cylindrical bores longitudinally disposed in the plugs, the bores attached or formed within the plugs at the desired camber angle and so positioned as to compensate for the change in wheelbase which would normally result from changing the camber angle. The stationary axle of the wheel is received and secured within the angled bore. The plugs bear a pattern of holes that may only be inserted in one alignment to attach to a mating pattern of holes in mounting plates formed in the rcesses in the sides of the chassis of the wheelchair. Alternatively, the mounting plate may have a keyway for attaching the plugs. Conventional screws are used to further secure the plugs within recesses in the chassis of the wheelchair.

13 Claims, 5 Drawing Sheets

U.S. PATENT DOCUMENTS

| | | | |
|---|---|---|---|
| 4,589,525 | 5/1986 | Phipps et al. | 188/2 F |
| 4,592,570 | 6/1986 | Nassiri | 280/650 |
| 4,593,929 | 6/1986 | Williams | 280/650 |
| 4,595,212 | 6/1986 | Haury et al. | 280/250.1 |
| 4,598.921 | 7/1986 | Fenwick | 280/250.1 |
| 4,607,860 | 8/1986 | Vogel | 280/650 |
| 4,648,619 | 3/1987 | Jungnell et al. | 280/650 |
| 4,664,441 | 5/1987 | Collins | 297/183 |
| 4,676,519 | 6/1987 | Meier | 280/250.1 |
| 4,679,816 | 7/1987 | Riikonen | 280/650 |
| 4,693,490 | 9/1987 | Loodberg et al. | 280/650 |
| 4,721,321 | 1/1988 | Haury et al. | 280/250.1 |
| 4,730,842 | 3/1988 | Summers et al. | 280/638 |
| 4,744,585 | 5/1988 | Huang | 280/646 |
| 4,749,064 | 6/1988 | Jinno et al. | 188/2 F |
| 4,754,987 | 7/1988 | Williams | 280/250.1 |
| 4,768,797 | 9/1988 | Friedrich | 280/250.1 |
| 4,770,432 | 9/1988 | Wagner | 280/250.1 |
| 4,805,925 | 2/1989 | Haury et al. | 280/250.1 |
| 4,813,693 | 3/1989 | Lockard et al. | 280/42 |
| 4,840,390 | 6/1989 | Lockard et al. | 280/250.1 |
| 4,852,899 | 8/1989 | Kueschall | 280/250.1 |
| 4,863,771 | 9/1989 | Freeman | 428/36.1 |
| 4,887,826 | 12/1989 | Kantner | 280/250.1 |
| 4,887,830 | 12/1989 | Fought et al. | 280/304.1 |
| 4,889,355 | 12/1989 | Trimble | 280/281.1 |
| 4,891,176 | 2/1990 | Drysdale et al. | 264/250 |
| 4,917,395 | 4/1990 | Gabriele | 280/250.1 |
| 4,921,271 | 5/1990 | Berry et al. | 280/661 |
| 5,060,962 | 10/1991 | McWethy | 280/250.1 |

FOREIGN PATENT DOCUMENTS

| | | |
|---|---|---|
| 501986 | 5/1954 | Canada . |
| 883578 | 7/1943 | France . |
| 451392 | 8/1936 | United Kingdom . |
| 939012 | 10/1963 | United Kingdom . |

Fig. 3
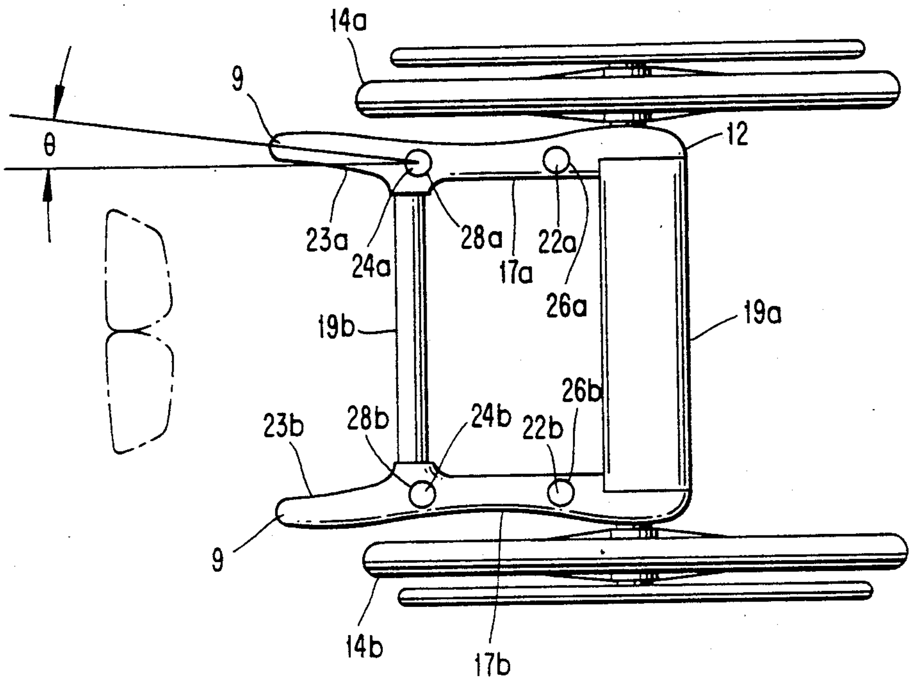
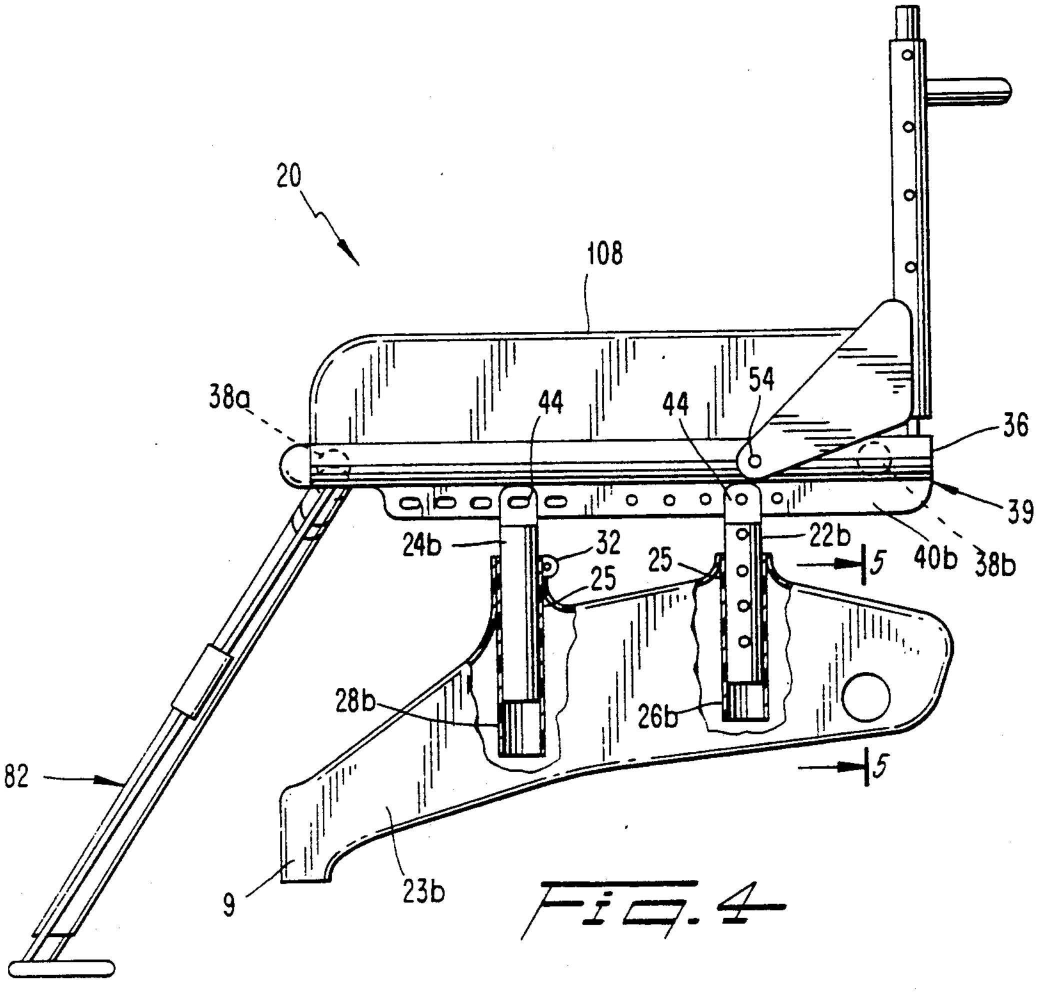
Fig. 4

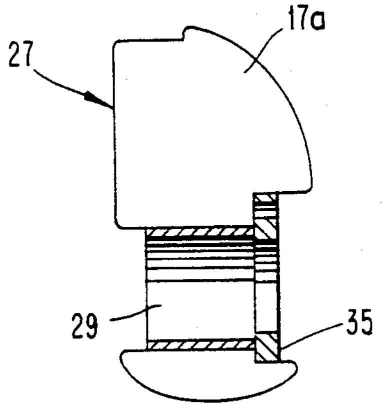
Fig. 5a
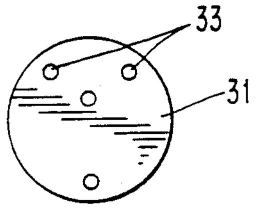
Fig. 5b
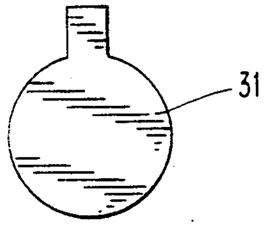
Fig. 5c
Fig. 6a
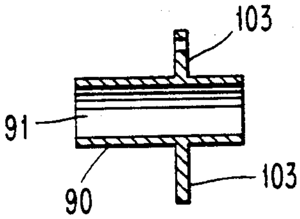
Fig. 6b
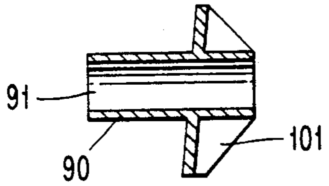
Fig. 6c
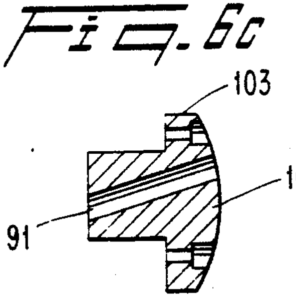
Fig. 6d
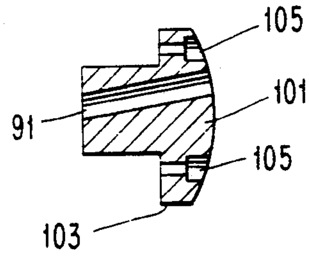

CAMBER ADJUSTMENT FITTING FOR A WHEELCHAIR

FIELD OF THE INVENTION

The present invention relates to wheelchairs. More specifically, the present invention relates to detachable fittings for preselecting camber angles for the wheels of a wheelchair.

BACKGROUND OF THE INVENTION

Wheelchairs are well known transportation appliances enabling the infirm, disabled and unwell person to move about with greater mobility than otherwise. Essentially, wheelchairs are small, single person conveyances typified by a chair supported by two outer, large diameter drive wheels behind the center of gravity of the user, and with two smaller swivel mounted wheels or castors located toward the front. Motive power may be supplied by an attendant pushing the wheelchair, by the user's hands and arms applied to the drive wheels, or by an auxiliary power source. The drive wheels may be cambered so that the distance between the two wheels at ground level is greater than the distance between the wheels at seating level. The camber angle provides stability for the wheelchair, and the inward tilt to the wheels at chair level enables the user to propel the chair more comfortably with the arms closer to the body.

While wheelchairs following many different designs have proliferated, there have been drawbacks heretofore that remain to be solved. In order to meet the needs and demands of the physically handicapped user, wheelchairs must be versatile and easily and readily adapted to accommodate the particular body shape and size of the user. Wheelchairs must also be versatile in adapting to both ambulatory and recreational travel, and they must be sufficiently rugged and durable to provide comfortable passage over uneven and irregular surfaces.

For instance, an unsolved need has arisen for a precise and convenient method for adjusting the camber angle of the wheels of the wheelchair in accordance with the various purposes for which the wheelchair is to be used. The camber angle may be adjusted from approximately 0 to 15 degrees and the stability generally increases as the camber angle increases. In addition, cambered wheels provide stability as the wheelchair is turned about a corner thereby helping to prevent the chair from tipping over. The camber angle for normal usage is approximately 3 degrees, while sports activities require greater camber angles for stability. For instance, camber angles for wheelchair basketball are typically 6 degrees, and camber angles for wheelchair tennis are typically 9 degrees.

A heretofore unsolved problem resulting from the camber angle of the wheels has been the inability of cambered wheelchairs to fit through narrow passageways. In addition, changing the camber angle has been time consuming, has required difficult mechanical, trial and error adjustments, and has resulted in undesirable changes in the wheelbase alignment of the castor wheels relative to the ground and the drive wheel base. Another unsolved need has been for a method for preselecting preset camber angles for specific user activities. Yet another unsolved need has been to provide a method for easily setting a camber angle without changing the wheelbase of the wheelchair.

Yet another unsolved need has been for a camber adjustment method for a modular wheelchair which may be customized to the needs of a particular patient by a therapist with simple adjustments without special skills, tools or training.

SUMMARY OF THE INVENTION WITH OBJECTS

A general object of the invention is to provide camber adjustment fittings for a wheelchair that overcome the limitations and drawbacks of the prior art.

A specific object of the invention is to provide a series of interchangeable camber adjustment fittings having preset camber angles so that a desired camber angle may be selected for a specific activity.

A further object of the invention is to provide plug-in interchangeable camber adjustment fittings for a wheelchair that enable the wheels of the wheelchair to be easily attached and removed from the wheelchair.

One more specific object of the present invention is to provide interchangeable camber adjustment fittings for a wheelchair that may be easily adapted for use with other standard wheelchair components, such as the chassis and conventional drive wheels.

Still another specific object of the present invention is to provide interchangeable camber adjustment fittings for a wheelchair providing a variety of preset camber angles so that the camber angle may be changed while the wheelbase remains constant.

In accordance with the principles of the present invention, a number of pairs of camber angle adjustment plugs are provided having preset angled bores for selection of a desired camber angle for the wheels of the wheelchair. The preset angles are embodied in cylindrical, longitudinally disposed bores extending through the plugs. The bores may be separately constructed and positioned and attached within a chamber formed in the plugs, or they may be molded within the plugs. Alternatively, the bores may be formed by drilling through solid plugs at a selected camber angle and position. The bores are so positioned to compensate for the change in wheelbase which would normally result from changing the camber angle. One end of a stationary axle of the wheel is mounted within the bore of the plug and the opposite end of the axle is snap mounted within the wheel hub assembly for rotation of the wheel about the stationary axle. Conventional screws are used to further secure the plugs within the recess of the chassis. The plugs preferably bear a pattern of holes that may only be inserted in one alignment to be attached to a mating pattern of holes in mounting plates formed in recesses in the sides of the chassis of the wheelchair. A key may be used in lieu of the hole pattern.

The chassis is provided having two longitudinal sides, one or more cross-bars between the sides, and two trussed or cantilevered, forwardly and downwardly extending arms terminating in sleeves for holding snap-in swivel castors. The molded chassis is constructed, using compression molding techniques or other molding techniques, from shock and vibration dampening materials, such as a carbon or glass fiber epoxy resin. The chassis sides and cross-bars are of hollow or foam filled construction. A generally C-shaped rear crossbar may be included and may be fitted with optional drive motors for independently driving the drive wheels of the wheelchair. Each longitudinal side of the chassis includes two vertically extending posts for attaching a seat, the posts providing a height adjustment mechanism for enabling the height of the seating system to be adjusted relative to the chassis. The height adjustment mechanism comprises a plurality of telescoping members securable at adjustable extensions relative to the chassis, the frame of the seating system being attached at the ends of the telescoping members. Each telescoping member includes a generally U-shaped block for engaging a selected portion of the frame of the seating system, and a locking pin is provided for locking the frame portion to the generally U-shaped block at one of a predetermined plurality of longitudinal positions, thereby facilitating the forward and rearward adjustment of the seating system relative to the chassis of the wheelchair. Also, within this aspect of the invention the plurality of telescoping members enables adjustment of the angle of attachment of the seating system to the chassis.

In another aspect of the invention, the camber adjustment plugs may be adapted for use with conventional wheelchair chassis designs by placing mounting plates in a recess formed in the sides of the conventional chassis design.

In one more aspect of the present invention, the camber plugs are used to attach a variety of wheels, including conventional wire spoke drive wheels, drive wheels constructed from composite materials and having a preselectable composite spoke design, and tensioned disk wheels.

In yet another aspect of the present invention, the camber adjustments plugs permit anti-tip wheels and smaller travel wheels that may be used to traverse narrow openings to be attached around the axle of the drive wheels prior to attachment of the axle within the plugs.

These and other objects, advantages, aspects and features of the present invention will be more fully understood and appreciated by those skilled in the art upon consideration of the following detailed description of a preferred embodiment, presented in conjunction with the accompanying drawings.

BRIEF DESCRIPTION OF THE DRAWINGS

In the Drawings:

FIG. 3 is a top plan view of a chassis and the drive wheels of the present invention of the FIG. 1 wheelchair with the seating system removed. The foot rests are shown in phantom to provide orientation in this view.

FIG. 4 is a somewhat diagrammatic side detail view in elevation and section of the FIG. 1 wheelchair showing the adjustable seat attachment mechanism of the chassis in greater detail.

FIG. 5*a* is a cross sectional, enlarged frontal view of the wheel attachment recess of the chassis and taken along the lines 5—5 in FIG. 4. FIG. 5*b* is an enlarged end view of the interior of the chassis wheel attachment recess showing the patterned mounting plate. FIG. 5*c* is an end view of a mounting plate having a keyway attachment.

FIGS. 6*a* through 6*d* show a number of embodiments of the interchangeable camber plugs constructed by a variety of methods and having bores defining selected camber angles and positioned for attachment of the drive wheel to the drive wheel attachment recess of the chassis.

FIG. 7*a* shows a non-cambered wheel and FIG. 7*b* shows a wheel at a selected camber angle.

DETAILED DESCRIPTION OF A PREFERRED EMBODIMENT

Figure 1:
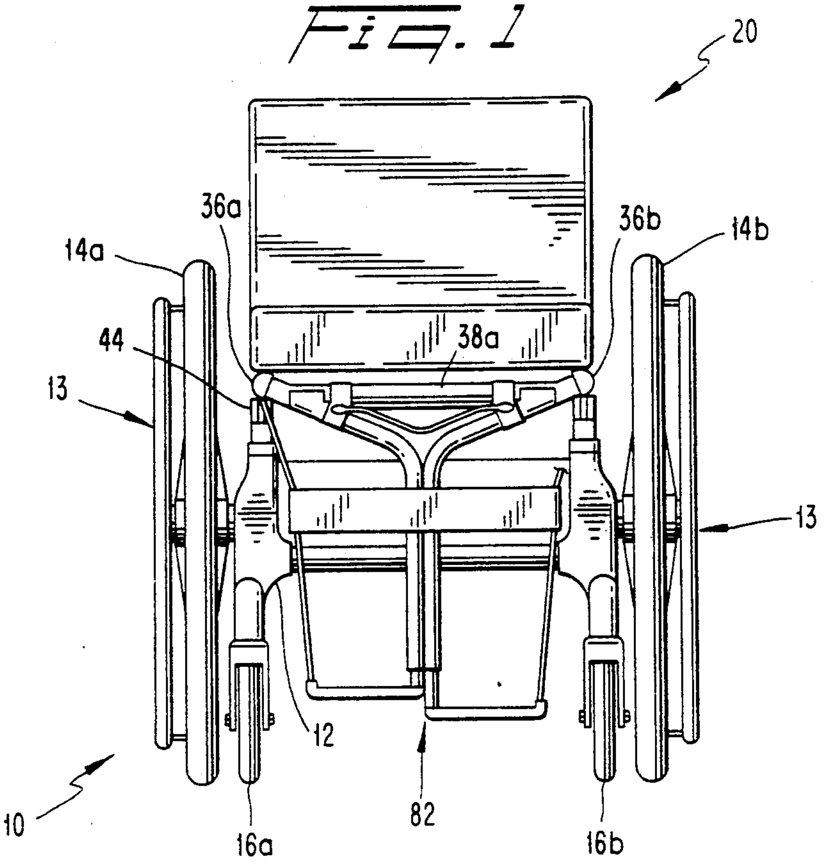
FIG. 1 is a front view in elevation of a wheelchair incorporating a camber adjustment plug of the present invention.
Figure 2:
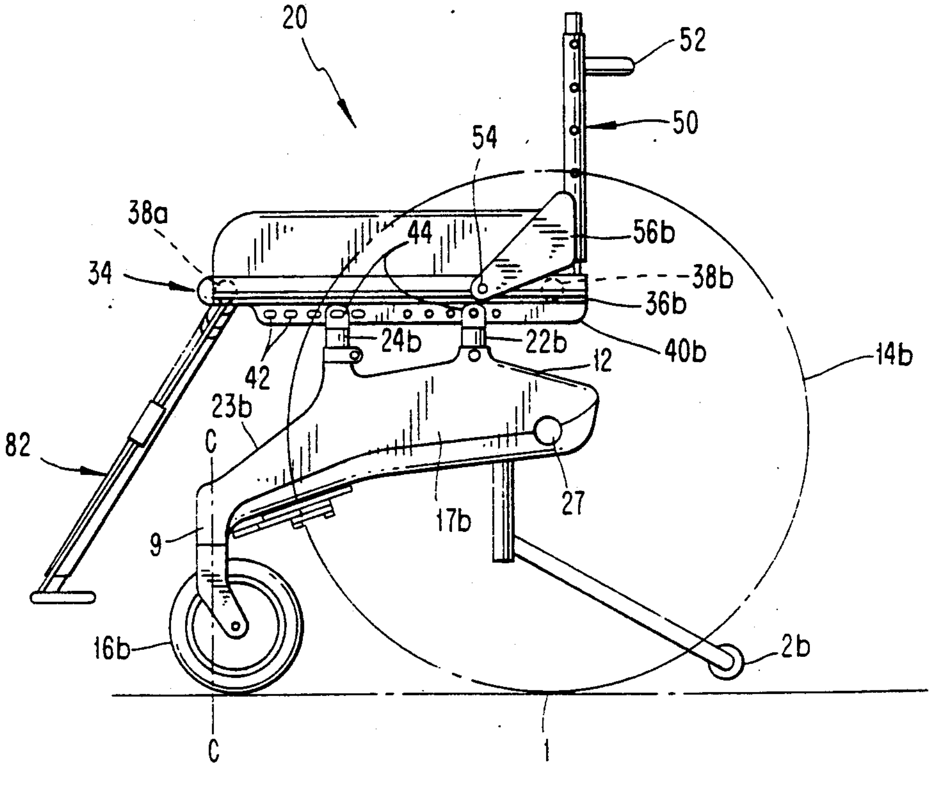
FIG. 2 is a somewhat diagrammatic side view in elevation of the wheelchair of FIG. 1 showing a chassis recess for mounting the camber adjustment plug of the present invention, with the drive wheel shown in phantom outline for clarity.

Referring to FIGS. 1 and 2, a wheelchair is shown generally at 10, and preferably includes the following detachable, modular components: a chassis 12, a wheel assembly 13 including drive wheels 14 and anti-tip wheels 2 and travel wheels (not shown), the wheel assembly 13 attached to two recesses 27 within the chassis 12 by the camber adjustment plugs 90 of the present invention (not shown in these views), a seating assembly 20 attached to the chassis 12, and a leg rest assembly 82 attached to the seating assembly 20. FIG. 1 shows vertical alignment of the drive wheels 14 thereby indicating that a camber angle of approximately zero degrees has been chosen for the wheelchair 10.

Referring to FIGS. 6*a*–6*d*, a number of interchangeable camber angle adjustment plugs 90 constructed by a variety of methods and embodying principles of the present invention are shown. The camber plugs are constructed by brazing or welding a formed bore 91 to a plate at a preset camber angle as shown in FIG. 6*a*, by drilling a bore 91 at a selected camber angle through a cast or machined block of a suitable substance such as aluminum, magnesium or plastic material as shown in FIG. 6*c*. Alternatively, the camber plugs may be molded from fiber reinforced material, or the fiber reinforced material may be cast around the positioned and angled bore, or the bores may be stamped directly into a plate. The preferred method of constructing the camber plugs 90 is by brazing or welding metallic, cylindrical formed bores at a variety of selected angles on to circular metallic plates bearing three mounting holes. The bores are positioned on the plate so as to compensate for any change in the wheelbase alignment caused by changes in vertical height from the axle to the ground when the camber angle is changed. The bores 91 in the plugs 90 are positioned so as to compensate for the difference in vertical height of the wheel when it is angled. The different angles selected for placement of the bores 91 enable the camber angle of the drive wheels 14 to be selected for particular user activities, such as sports activities. A preselected pair of camber plugs providing for a tow-out of the drive wheels may be provided and is particularly useful for sports activities.

The outer ends 101 of the plugs 90 may be adapted to conform to a curved surface on the chassis. Mounting brackets 103 may be included for securing the plugs 90 to the chassis 12. The brackets 101 may include conventional internal screw patterned passages 105 for attaching the plug 90 to the chassis with screws.

Referring now to FIGS. 5*a* and 5*b*, a sectional view of the longitudinal side of the chassis 12 is shown with the camber plug attachment mechanism shown generally at 27. The attachment mechanism 27, one for each longitudinal side 17 of the chassis, is a cylindrical recess 29 within the outer surface of side 17. The cylindrical recess 29 initiates at a notched bracket portion 35 of the outer surface of contoured side 17, and terminates at a molded-in mounting plate 31, shown in FIG. 5*b*, bearing a pattern of holes 33. A mating pattern of holes (not shown) are included on the plugs 90 thereby enabling the plug 90 to be aligned and attached by screws within the recess 29 in only one alignment. Alternatively, the plugs 90 may be attached within keyways formed in the mounting plates 31, as shown in FIG. 5*c*.

Figure 7B:
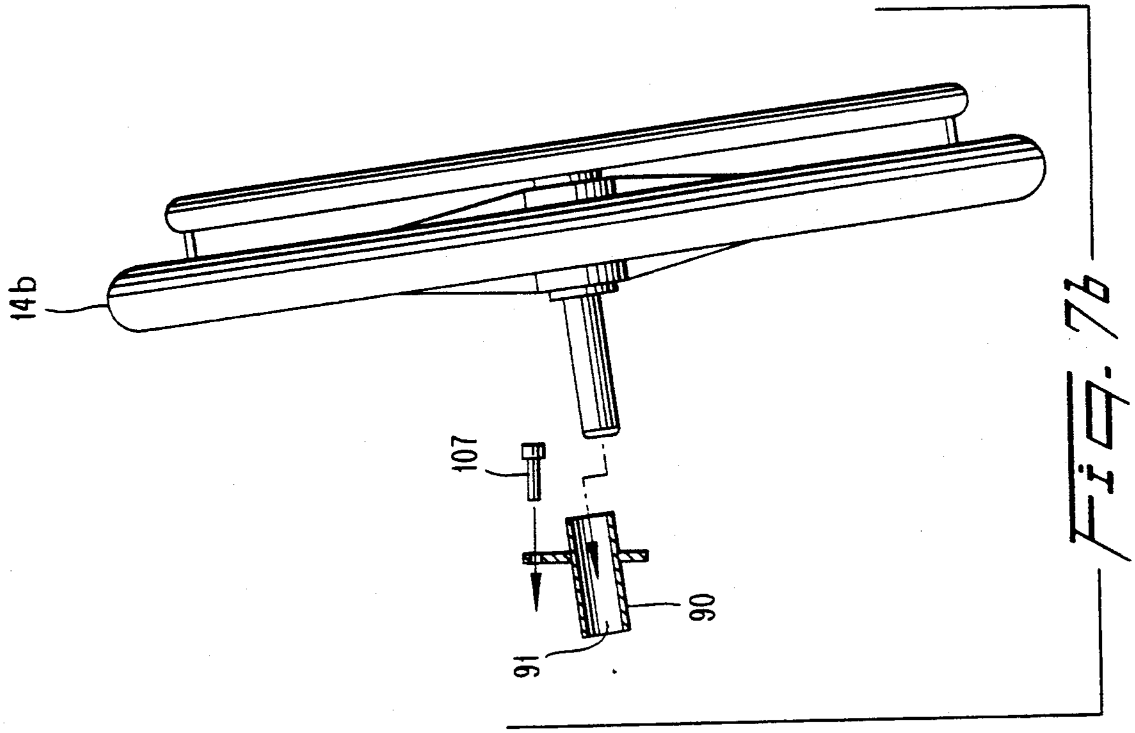
FIGS. 7*a* and 7*b* are front views in partial section of a camber plug, chassis recess and drive wheel showing the method of attachment whereby the wheelbase alignment remains constant.
Figure 7A:
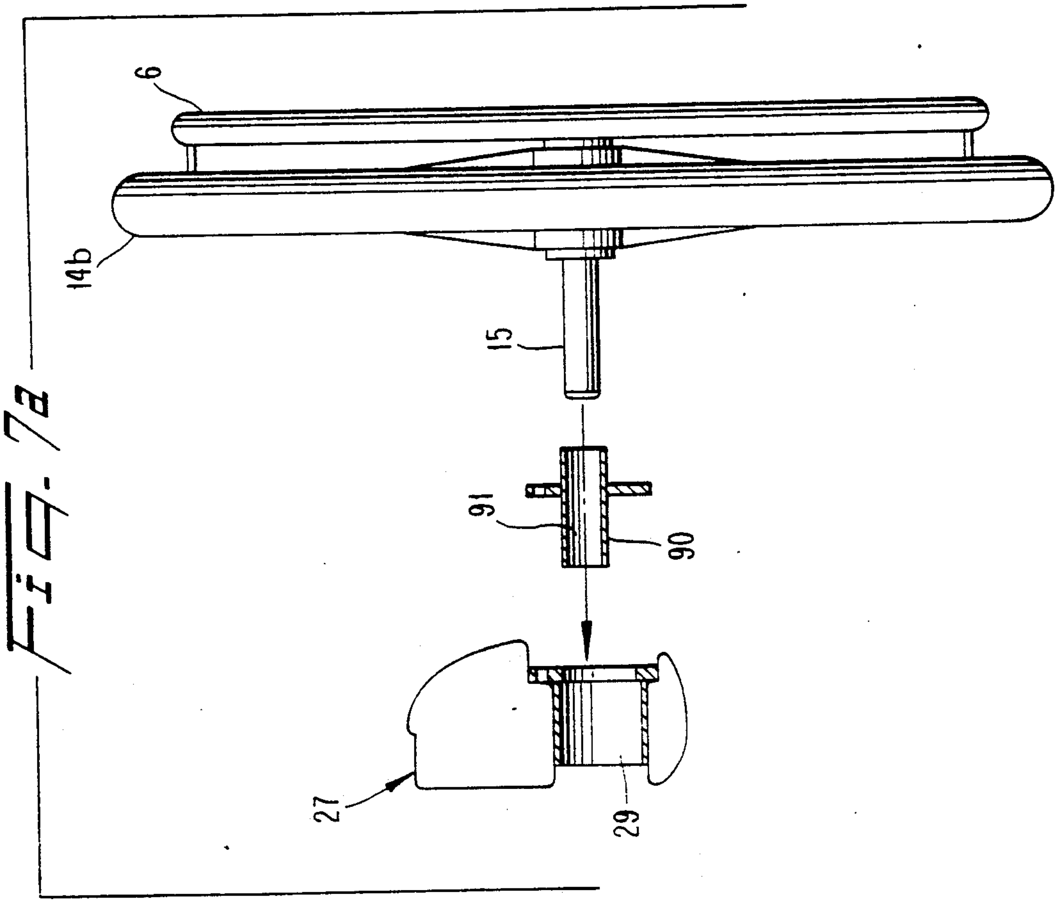

Referring now to FIGS. 7*a* and 7*b*, the method of alignment whereby the camber plugs 90 take up the vertical height difference when the wheel is angled, thereby maintaining a constant wheelbase, is demonstrated. The non-cambered wheel in FIG. 7*a* is shown having the axle 15 aligned with the plug 90, prior to attachment within recess 29. FIG. 7*b* shows a cambered wheel 14*b* and the bore 91 placed at the selected camber angle while retaining the fixed wheelbase alignment. Screw 107 is shown for securing the plug 90 within the recess 29.

One end of the stationary drive wheel axle 15 is mounted within the bore 91 of the plug 90, and the opposite end of the axle is snap-mounted within the wheelhub for rotation of the wheel. Conventional bearings are included within the wheel assembly for rotation of the wheels. The alignment plug 90 and the wheel mounting mechanism 27 together permit the camber of the drive wheels 14 to be easily adjusted without changing the wheelbase or the seat height.

Figure 8A:
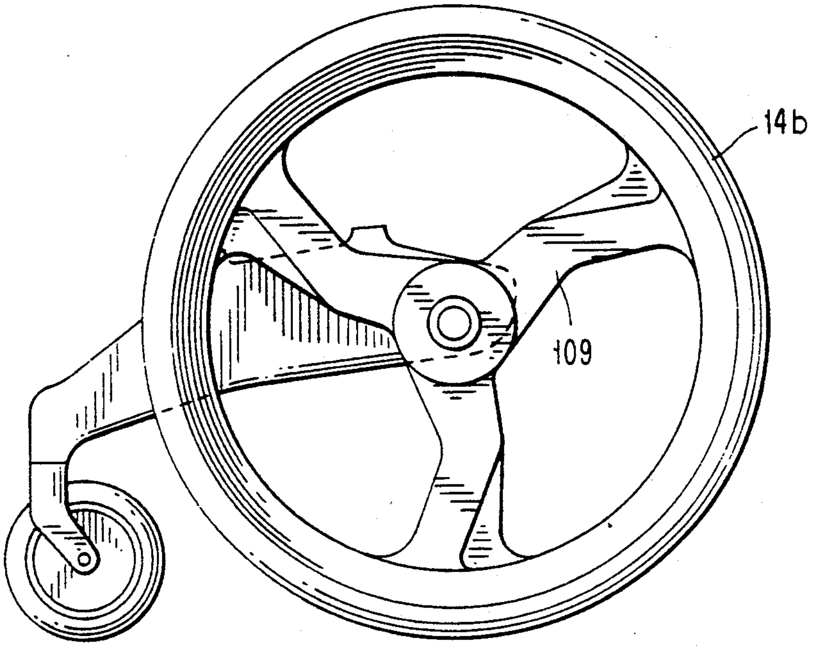
FIGS. 8*a* and 8*b* show two aspects of the drive wheels that may be attached to the wheelchair with the camber plugs of the present invention, including a three-spoke composite wheel and a convention wire drive wheel partially cut away to reveal an anti-tip wheel.

Referring to FIGS. 7*a* & b, and FIG. 8, the wheel assembly 13 includes the drive wheels 14*a* and 14*b*, the travel wheels 13*a* and 13*b* (not shown), and the anti-tip wheels 2*a* and 2*b*. The smaller travel wheels 13 (not shown) and the anti-tip wheels 2 may be mounted around the axle 15 between the drive wheel 14 and the alignment plug 90.

Figure 8B:
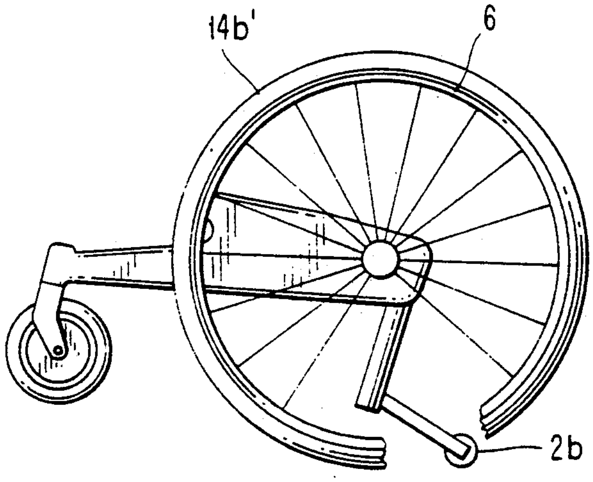

The camber adjustment plug of the present invention may be used to mount virtually any wheel suitable as a drive wheel, including conventional wire spoke wheels as shown in FIG. 8*b*, tensioned disk wheels (not shown), and drive wheels constructed from composite materials with and without rings and hubs. The drive wheels 14 may have three composite spokes, as shown in FIG. 8. The three spokes are sufficiently broad to prevent the user's clothing from becoming entangled in the spokes. In another aspect (not shown), approximately 5 composite spokes are provided. All of the drive wheels have a wheel axle 15 which is mounted within the angled wheel alignment plug 90 at the selected camber angle. The anti-tip wheels are mounted over the axle of the drive wheels and used therewith. The drive wheels 14 may be standard 24" pneumatic wheels, or may be any wheels functioning with a suitably sized diameter axle. Presently, a ½" diameter steel axle is preferred.

The chassis 12 is formed by compression molding or other molding techniques from composite materials such as a carbon or glass fiber epoxy resin. The composite material may be tailored to user specifications. All surfaces are contoured to provide a rounded, smooth and streamlined appearance to the chassis 12.

Referring to FIGS. 2 and 3, the chassis 12 defines two hollow or foam filled, longitudinal side rails 17*a* and 17*b* connected by hollow or foam filled cross-bars 19*a* and 19*b*. The anterior ends of side rails 17*a* and 17*b* define forwardly and downwardly extending, cantilevered arms 23*a* and 23*b*. Two swivel-mounted castors 16*a* and 16*b* are conventionally attached by snap-locks to the sleeves 9 of the arms 23*a* and 23*b*, and are thereby positioned anterior to the drive wheels 16*a* and 16*b*. The axis of the castor wheels 16, identified as the dotted line cc in FIG. 2, is fixed at 90 degrees relative to the ground level 1 and the base of the drive wheel 14 in order to prevent a self-steering tendency of the swivel castor wheels 16. Adjustment of the camber angle of the wheelchair using the camber adjustment plugs of the present invention does not affect the fixed axis of the castor wheels 16.

The sleeve portion 9 of the arms 23 extend below the plane of the sides 17, the composite material in the arms 23 providing known shock absorbing functions for the wheelchair. The composite material of chassis 12 causes the flexible and resilient arms to yield slightly under a vertically directed impact. The arms 23 individually react to impact and may flex slightly to maintain the alignment of the upper frame portion of the chassis formed by the cross-bars 19 and the sides 17.

Composite materials are known to be lightweight, strong, resilient, and moldable. The amount of resilience can be preselected during manufacture using techniques well established among those skilled in the art of composite materials. For example, the chassis may be formed from fiberresin unidirectional tape of a selected fiber composition, alignment and density thereby preselecting the shock absorbing properties of the chassis for a predetermined impact direction. The chassis sides 17 and cross-bars 19 are hollow or foam filled shells thereby creating a light-weight chassis enabling components, such as drive motors, to be stored within hollow shells.

The position of the arms 23 in relationship to the longitudinal sides 17 may be preselected to create an acute angle $\theta$ from approximately 5 degrees to 20 degrees. The acute angle $\theta$ makes it easier to closely approach the seat of the wheelchair; and, the acute angle creates a space underneath the chassis and seat. The space may be used for storage bags or for wheel chair auxiliary equipment such as a power supply or other electronic components.

Referring to FIGS. 2–4, the seating system 20 is demountably attached to the chassis 12 by four mounting posts: two rear posts 22*a* and 22*b* and two forward posts 24*a* and 24*b* which telescope upwardly from within the molded chassis structure 12. The rear posts 22*a* and 22*b* adjustably telescope along an upward locus within the two rear tubes 26*a* and 26*b* within the chassis 12, while the forward posts 24*a* and 24*b* telescope within two forward tubes 28*a* and 28*b* as shown in FIGS. 3 and 4. The four tubes 26*a*, 26*b*, 28*a*, and 28*b* each define an upper, annular neck portion 25.

The rear posts 22*a* and 22*b* may be set at progressively stepped heights by virtue of holes 30 and a transverse locking pin passing through a selected hole through the post 22 and a transversely aligned hole pair defined through the corresponding tube 26. The front posts 28*a* and 28*b* telescope throughout a continuous range. A pair of compression clamping mechanisms 32*a* and 32b compress the corresponding annular neck portion 25 of the tubes 28a and 28b about the corresponding posts 24a and 24b to lock the posts 24 at the desired height. A levered release nut (not shown) enables the clamping mechanism 32 to be released and the post 28 to be adjusted without any external tools. In this manner, the height of the seating system 20 relative to the drive wheels 14a and 14b may be easily and readily established, in order to provide an adjustment of the seat height relative to the chassis 12 to take into account the length of the user's arms. This is important in order to provide a comfortable, effective driving relationship between the user's hands and arms and the drive wheels 14, so that the user may efficiently provide the motive force to drive the drive wheels 14a and 14b and thereby propel the wheelchair 10. It will be understood by those skilled in the art that the selected height of the rear posts 22 may be secured by a compression clamping mechanism 32, that the selected height of the front posts 28 may be secured by locking pins, or that clamping mechanisms or locking pins may be used for both the rear posts 22 and the front posts 28.

The angle of the seating system 20 relative to the chassis 12 (and to the generally horizontal surface over which the wheelchair 10 is propelled) may also easily be adjusted by height adjustment of the forward posts 24 relative to the rear posts 22.

The rail 40a (not shown) is adjustably attached to the mounting posts 22a and 24a, and the rail 40b is adjustably attached to the mounting posts 22b and 24b. While there may be a virtually unlimited number of longitudinal attachment positions of the seating system 20 by the rails 40, five positions are shown in FIG. 4 by virtue of transverse holes 42 defined through the rails 40b. Each mounting post 22 and 24 includes a generally U-shaped mount 44, and a releasable locking pin 46 (not shown) passes through the U-shaped mount 44 and into a selected mating hole 42 on the seating system 20. A locking nut (not shown) may be used with the locking pin 42, or the locking pin 42 may be self-contained with an expansion collet or projection end. (Such self locking pins are in common, widespread use in rigging of sailboats.) In this manner, the center of gravity of the user may be adjusted relative to the chassis 12 and its fixed wheelbase between the drive wheels 14 and the castors.

An adjustable leg rest assembly 82 may be demountably attached to the seating assembly 20.

Although the presently preferred embodiment of the invention has been illustrated and discussed herein, it is contemplated that various changes and modifications will be immediately apparent to those skilled in the art after reading the foregoing description in conjunction with the drawings. For instance, the specifications of the molded chassis may be preselected to mount a variety of seating assemblies, with or without leg rest assemblies, thereby enabling the user to participate in activities, such as sports. The camber plugs permit most desired wheel systems to be easily mounted to the universal chassis. Accordingly, it is intended that the description herein is by way of illustration and should not be deemed limiting the invention, the scope of which being more particularly specified and pointed out by the following claims.

What is claimed is:

1. A camber adjustment assembly for a wheel system of a wheelchair comprising:

a plurality of interchangeable pairs of plug means for receiving an axle of a wheelchair wheel, each plug means of each pair being insertable into opposite outside sides of a wheelchair chassis, each of said pairs providing a different predetermined camber angle for wheels mounted on opposite sides of said wheelchair chassis while maintaining said chassis at a constant preselected height.

2. A camber adjustment assembly for a wheel system of a wheelchair in accordance with claim 1, wherein each plug means of each pair includes a cylindrical bushing having a bore, said bore being sized to receive said axle of said wheelchair wheel and said bore being angularly positioned within said bushing according to said predetermined camber angle.

3. A camber adjustment assembly for a wheel system of a wheelchair in accordance with claim 2, wherein said predetermined camber angle ranges from substantially zero degrees to about 15 degrees.

4. A camber adjustment assembly for a wheel system of a wheelchair in accordance with claim 2, wherein each plug means of each pair further includes a flange means for securing said plug means to said wheelchair chassis, said flange means being fixed to said cylindrical bushing.

5. A camber adjustment assembly for a wheel system of a wheelchair in accordance with claim 1, wherein each plug means of each pair is a hollow cylinder welded to a flange plate at an angle corresponding to said predetermined camber angle.

6. A camber adjustment assembly for a wheel system of a wheelchair in accordance with claim 2, wherein each plug means of each pair is a casting wherein said bore is drilled therethrough.

7. A camber adjustment assembly for a wheel system of a wheelchair in accordance with claim 2, wherein each plug means of each pair is formed of molded composite material.

8. A camber adjustment assembly for a wheel system of a wheelchair in accordance with claim 2, wherein each plug means of each pair is a casting wherein said bore is molded into said casting.

9. A camber adjustment assembly for a wheel system of a wheelchair in accordance with claim 2, wherein said cylindrical bushing of each plug means of each pair is fixed to a plate and said bore of each plug means is positioned relative to the plate such that said chassis is maintained at a preselected height despite variations in said predetermined camber angle of said wheels.

10. A camber adjustment assembly for a wheel system of a wheelchair in accordance with claim 2, wherein at least one of said plurality of pairs of plug means includes means for positioning said wheelchair wheel in a tow-out position.

11. A camber adjustment assembly for a wheel system of a wheelchair in accordance with claim 1, wherein each plug means of a selected pair are receivable in a recess located on the sides of said chassis, said recesses being positioned along a constant longitudinal axis.

12. A camber adjustment assembly for a wheel system of a wheelchair in accordance with claim 1, wherein each recess includes a mounting plate disposed at one end of said recess, said mounting plate having a pattern of holes for receiving corresponding notches on said plug means such that said plug means may be secured within said recess in only one alignment.

13. A camber adjustment assembly for a wheel system of a wheelchair in accordance with claim 11, wherein each recess includes a mounting plate disposed at one end of said recess, said mounting plate having a keyway for receiving a corresponding key on said plug means such that said plug means may be secured within said recess in only one alignment.

* * * * *